United States Patent [19]
Baird et al.

[11] 3,938,072
[45] Feb. 10, 1976

[54] RESONANCE EARTH STRUCTURE LOGGING

[76] Inventors: Charles Baird, 77 Olive St., Oak View, Calif. 93022; William B. Plum, 611 Colina Vista, Ventura, Calif. 93003

[22] Filed: Mar. 18, 1974

[21] Appl. No.: 452,052

[52] U.S. Cl. ............ 340/15.5 R; 181/108; 181/401; 340/10; 340/17 R; 73/67.2; 73/67.8 R
[51] Int. Cl.² .......................................... G01V 1/00
[58] Field of Search ......... 73/67.8 R, 67.2; 181/102, 181/104, 105, 108, 401; 340/9, 17, 10, 15.5 DS, 15.5 CP; 310/8.2

[56] References Cited
UNITED STATES PATENTS

| | | |
|---|---|---|
| 2,431,233 | 11/1947 | Erwin .................................. 73/67.8 |
| 2,538,114 | 1/1951 | Mason ................................. 73/67.8 |
| 2,693,106 | 11/1954 | Henry .................................. 73/67.8 |
| 3,593,257 | 7/1971 | Massa, Jr. ............................. 340/9 |
| 3,716,828 | 2/1973 | Massa .................................. 340/10 |

*Primary Examiner*—Malcolm F. Hubler
*Assistant Examiner*—H. A. Birmiel
*Attorney, Agent, or Firm*—Evert A. Autrey

[57] ABSTRACT

A sonic generator sends a collimated acoustical wave into the section of earth under test and resonance conditions are established depending upon the nature and depth of discontinuities in the path of the acoustical wave. These resonance conditions are monitored by observing and recording electrical relationship in the power supply section of the sonic generator.

4 Claims, 4 Drawing Figures

RESONANCE EARTH STRUCTURE LOGGING

BACKGROUND OF THE INVENTION

This invention relates to a method and apparatus for logging earth formations of the type wherein electrical parameters and relationships of the power supply driving a transducer are recorded as the output of the transducer coupled to the earth establishes resonance conditions.

Geophysical prospecting has been used extensively for many years to obtain information about the internal structure of the earth. The usual method of doing this involves generating a pulse of energy, typically by setting off an explosive charge in a bore hole or by the operation of a mechanically driven thumper, and recording the return of the transmitted pulse as it is sent into the earth and is returned as an echo after being reflected from discontinuities. It is conventional practice to position the geophones used to receive reflected pulses or echoes in a pattern around the pulse generator. The geophone instruments typically incorporate pickup transducers to record echo pulses.

SUMMARY OF THE INVENTION

In the instant invention the energy is fed into the earth as a collimated beam, and reflected waves from interfaces travel directly back to the point of origin which is the transducer assembly converting electrical energy into mechanical motion. The interaction of outgoing and incoming waves creates resonance states which affect the driving transducers. The power supply driving the transducer elements is in turn affected and the electrical parameters thereof may be recorded and displayed. The recorded behavior of the power supply is the useful output of the system. A simulated borehole is thus created without the use of separate pickup transducers, without the recording of individual echoes, and without making an actual borehole.

The invention also comproses a method of utilizing resonance phenonmena in the manner indicated to log subsurface structure.

An object of the invention is to provide an improved method and apparatus wherein the behavior of a sonic generator creating resonance patterns is utilized for indicating subsurface structure.

Other objects and many of the attendant advantages of this invention will be readily appreciated as the same becomes better understood by reference to the following description.

DESCRIPTION OF THE PREFERRED EMBODIMENTS

Figure 1:
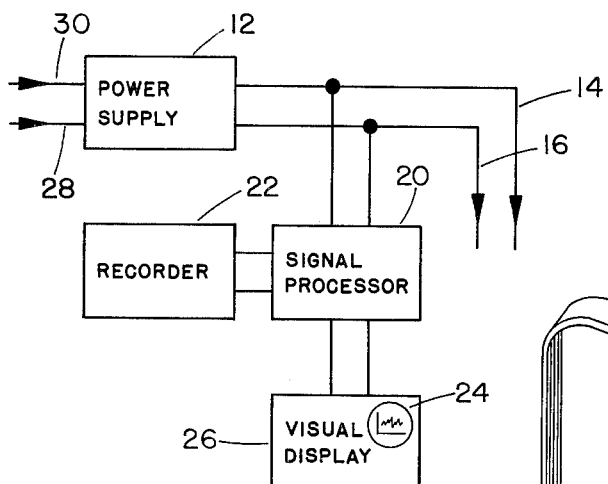
FIG. 1 is a diagrammatic view showing the power supply and associated signal processing equipment.

The apparatus shown in FIG. 1 comprises power supply 12 providing an output to drive transducer elements by way of leads 14 and 16. Electrical relationships of the output of power supply 12 are monitored by signal processor 20 which in turn provides an output to recorder 22 such as a strip chart of X-Y plotter. It is often useful to observe the real time behavior of the elctrical parameters on the cathode ray tube display 24 of oscilloscope 26. Input to power supply 16 is provided on leads 28 and 30.

Figure 2:
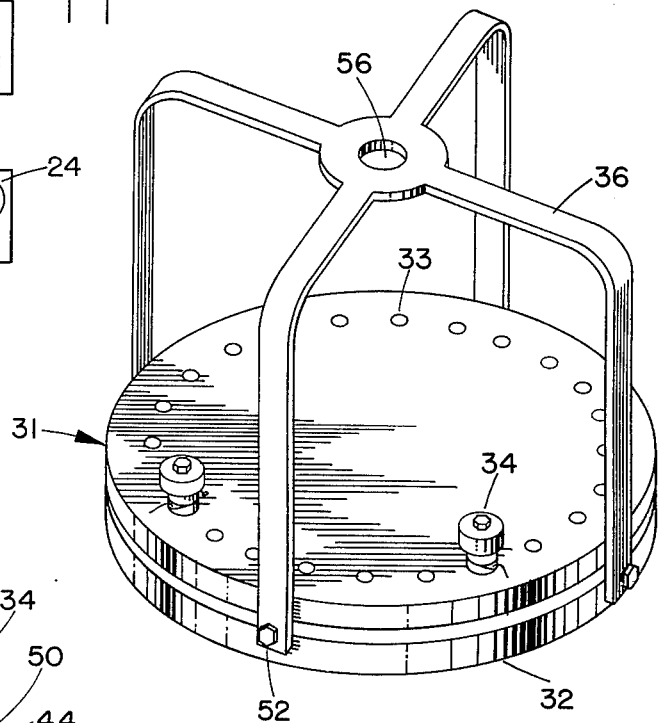
FIG. 2 is a perspective view showing the transducer assembly used in conjunction with the power supply and equipment shown in FIG. 1.
Figure 3:
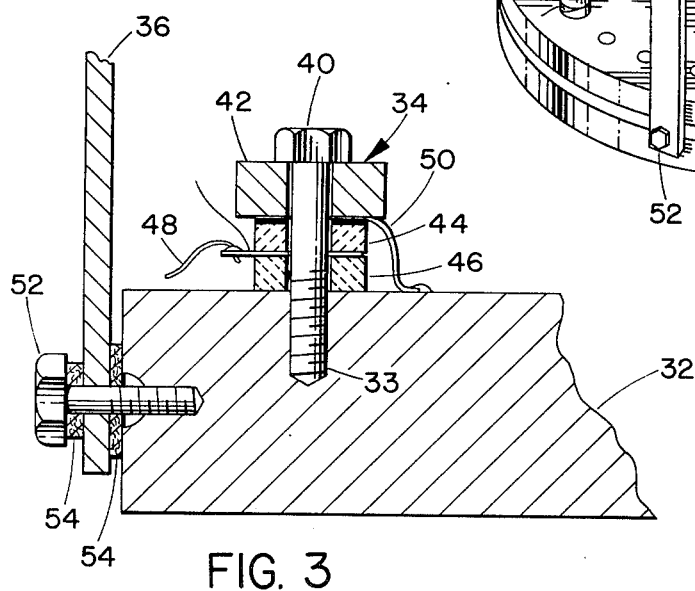
FIG. 3 is an enlarged view, partly in section, of part of the transducer assembly shown in FIG. 2.

The transducer assembly 31 is shown in detail in FIGS. 2 and 3. The base plate 32, which may be on the order of 16 inches in diameter and 4 inches thick, is conveniently formed of cold rolled steel and is solid except for openings 33 to accommodate individual driving elements 34. A liftng yoke 36 is bolted to the edge of plate 32 to avoid node formation problems as the plate is energized. There are more than 20 driving elements 34 each rated as 100 watts and arranged in a circle on the upper surface of plate 32. The elements 34 are connected in series-parallel to achieve the desired relationship to the output impedance of power supply 12 and are driven in phase.

As shown in FIG. 3, the transducer driving elements 34 are each made up of a bolt 40 passing through the center of steel slug 42, upper piezoelectric element 44, and lower piezoelectric element 46. The lower threaded end of bolt 40 engages threaded hold 33 so the transducer driving assemblies can be tightened to baseplate 32. The upper and lower surfaces of piezoelectric elements 44 and 46 are metallized and the elements are polarized in accordance with well known procedures so that lead 48 joined to metal washer 49 at the center of the two adjacent elements goes to one output lead from power supply 12. The upper surface of element 44 and the lower surface of element 46 are connected in common through lead 50 to the other lead from power supply 12. Single piezoelectric elements may be used in each driving element with lower output. Slug 42 which may be made of steel or other relatively heavy metal provides a mass that the piezoelectric driving elements work against when energized to drive plate 32. Lifting yoke 36 is secured to plate 32 by means of bolts 52. Packing washers 54 of soft material prevent yoke 36 from damping unduly the vibration of plate 32. A lifting cable may be threaded through opening 56, shown in FIG. 2, for moving and positioning the transducer assembly. The wires to the transducer driving elements may be secured to the lifting cable and dressed down one leg of yoke 36 before leads branch out to individual elements. As an alternative the plate may be driven by magnetostrictive or other types of transducer elements.

In the operation of the structure thus far described, the power supply-transducer circuit is considered first. This circuit has resistance, inductance, and capacitance characteristics. When the circuit is tuned to a low ultrasonic frequency, the inductive reactance will cancel the capacative reactance and the current in the circuit will be at a maximum. The current in a circuit in resonance will be limited only by the value of the resistance in the circuit. Base plate 32 has a thickness chosen that is one half the wavelength of the sound in the metal at the preassigned frequency. The metal plate vibrates in resonance with the elements attached thereto, and the electrical current will be at a maximum when the plate is suspended in air.

When the bottom of base plate 32 is lowered into contact with the earth, the natural frequency of the plate will drop and the current in the power supply will also drop, and there will also be phase angle changes.

This condition will result since the natural frequency of the loaded transducer is lower than that of the transducer plate in air. The transducer will send a continuous noncavitational wave into the earth. The diameter of the metal plate and the frequency of the generator are preassigned to give a parallel wave within a total spread of not more than 15°. The shape of baseplate 33 with parallel upper and lower surfaces separated by the plate thickness provides a generator producing this narrow acoustic output beam due to constructive and destructive interference effects. Once the broadcast is started it is normally continued until all formations have been reached and resonance established with the extreme depths. With the vibrating plate in contact with the earth, the changes in current in power supply 12 may be observed by watching the appearance of the display tube in oscilloscope 26 or of the output of recorder 22. Signal processor 20 incorporates an analog to digital convertor and also a dedicated computer to handle the arithmetical functions in a manner well known in the data processing art. There will be no change in current in the power supply-transducer circuit until resonance is built up in the earth between the transducer and the first interface reached by the acoustical wave. Resonance in this layer of the earth will lower the damping of the metal plate and the transducer frequency will be raised nearer to the natural frequency. Since resonance is being maintained in this sector of the earth, the current will increase until equilibrium is reached. This condition will prevail until energy is received from the second interface. The total energy received from the first and second interfaces will be greater than that received from the first alone, therefore there will be a corresponding increase in current. This condition will repeat itself when energy is received back from the third, fourth, fifth interface, and so forth. Each time additional energy is received from a new interface the current in the power supply-transducer circuit will increase.

Figure 4:
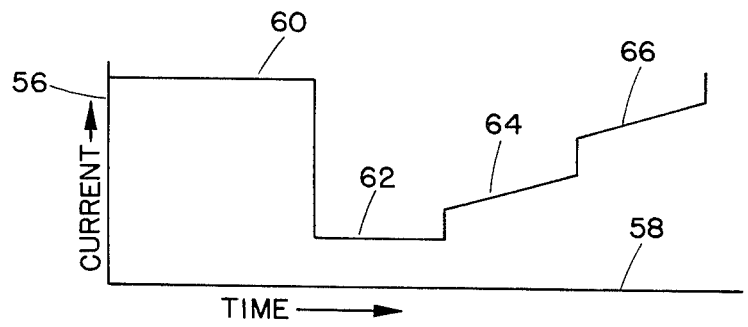
FIG. 4 is a time versus current graph showing a typical power input plot to the transducer as resonance conditions are established.

The chart for a typical resonance buildup pattern is shown in FIG. 4 wherein current in the power supply-transducer circuit is plotted on vertical axis 56 versus time along horizontal axis 58. The high current as base plate 32 vibrates in air shows up as a high fixed value at line 60. When plate 32 is first lowered to the ground the current is also lowered and goes to the value shown by line 62 which then rises as time goes by and resonance is built up. Successive resonance currents represented by lines 64 and 66 point to the presence of still deeper discontinuities. The equipment is calibrated and operators trained by operating in areas for which geophone traces recorded by previously known techniques are available for giving average velocities to each respective interface. Repeated determinations may be made at any selected site for assurance that the equipment is working properly. The transducer is moved to new locations on a grid pattern as determinationa are made so that areas can be mapped for possible oil or mineral deposits.

Obviously many modifications and variations of the present invention are possible in the light of the above teachings. It is therefore to be understood that within the scope of the appended claims the invention may be practiced otherwise than as specifically described.

What is claimed is:

1. Apparatus for resonance earth structure logging comprising:
   a. a constant frequency power supply,
   b. a transducer adapted to be driven by the output of the power supply, and
   c. means for presenting the electrical relationships of the output of said power supply as said transducer is operated at resonance while in contact with the earth, said electrical relationships versus time providing a representation of the subsurface structure of the earth.

2. A method for logging earth formations comprising:
   a. energizing a transducer in contact with the earth by means of a constant frequency power supply at the resonance frequency of the transducer,
   b. displaying the electrical relationships of said power supply vs. time; and
   c. determining from said relationships a representation of the structure of the earth.

3. The apparatus of claim 1 wherein said transducer comprises:
   a. a baseplate having parallel upper and lower surfaces and adapted to receive transducer driving elements on said upper surface,
   b. metal slugs,
   c. piezoelectric elements,
   d. holding means securing said metal slugs to said baseplate and spaced apart therefrom by at least one piezoelectric element for each slug.

4. The apparatus of claim 1 wherein said transducer comprises:
   a. a generally cylindrical baseplate having flat and parallel upper and lower surfaces and defining threaded bores in said upper surface,
   b. first and second generally cylindrical piezoelectric elements having conductive flat surfaces and a bore concentric with the outer cylindrical surface,
   c. generally cylindrical metal slugs defining a bore concentric with the outer cylindrical surface,
   d. a first power input lead connected to adjacent conductive surfaces of said peizoelectric elements,
   e. a second input lead connected to nonadjacent conductive surfaces of said piezoelectric elements, and
   f. means joining said first and second power input leads to the output of said power supply whereby said baseplate may be driven by said piezoelectric elements.

* * * * *